Jan. 14, 1936.  E. L. DENNIS  2,028,049
FLUID PRESSURE CONTROL APPARATUS
Filed Nov. 25, 1932   4 Sheets-Sheet 3
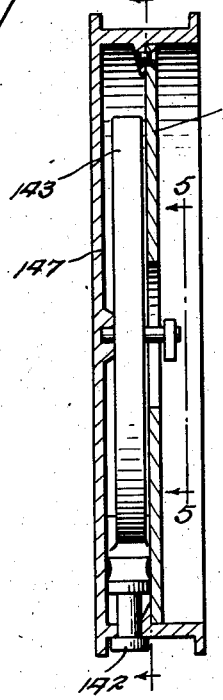
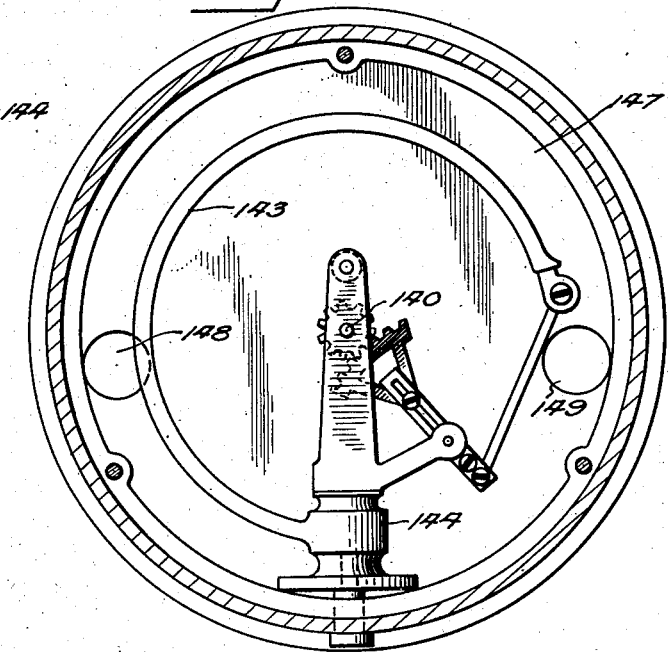
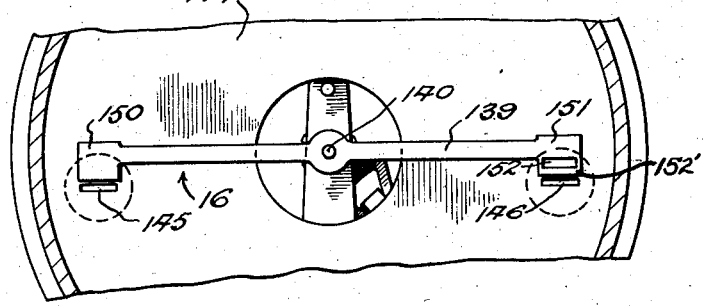
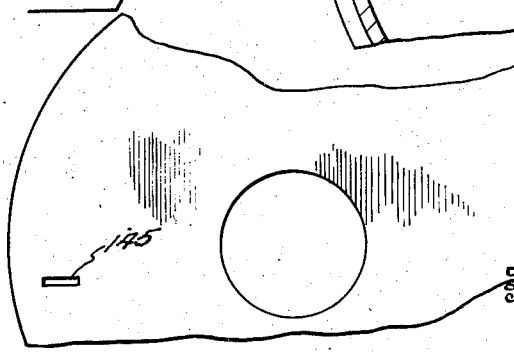
Inventor
Edwin L. Dennis
By Mason Fenwick & Lawrence
Attorneys Jan. 14, 1936.　　　　E. L. DENNIS　　　　2,028,049
FLUID PRESSURE CONTROL APPARATUS
Filed Nov. 25, 1932　　　4 Sheets-Sheet 4

Inventor
Edwin L. Dennis
By Mason Fenwick Lawrence
Attorneys

Patented Jan. 14, 1936

2,028,049

UNITED STATES PATENT OFFICE 2,028,049

FLUID PRESSURE CONTROL APPARATUS

Edwin L. Dennis, Reserve, La.

Application November 25, 1932, Serial No. 644,352

10 Claims. (Cl. 236—26)

This application is a continuation-in-part of my application, Serial No. 574,666, filed November 12, 1931 for Automatic fluid pressure control. The subject matter of this application is in the nature of an improvement on the apparatus disclosed in the first named case, which has matured into United States Patent No. 1,914,682, June 13, 1933.

As in my prior application, the present invention relates generally to apparatus for controlling or stabilizing fluid pressure or temperature by means responsive to the pressure or temperature to be controlled or stabilized. Specifically, the invention relates to apparatus for controlling the pressure or temperature in the steam chambers of boilers or the like, in which the apparatus is controlled in operation by changes of pressure or temperature in said chambers.

The invention is of peculiar importance in the sugar industry, in which the load is very fluctuating. Instantaneous loads as high as 1500 horse power are thrown on or off the line. Under hand control it has been found impossible to maintain a pressure within a fifteen pound range; and the boilers frequently change from 100% rating to 200%, or reverse, in as short an interval as twelve minutes. It is, of course, desirable to maintain this pressure as nearly constant as practicable.

The apparatus disclosed in my prior application has been found capable, in actual practice, of maintaining the pressure within one pound in either direction. However, where the loads are subject to great fluctuation, it has been found preferable to control the fuel flow and damper control apparatus of the boiler in timed steps, in order to avoid periodic rapid variations of decreasing amplitude on opposite sides of the desired constant pressure, and to preclude possible overfiring or underfiring of furnaces, not in proportion to change in steam demand, if timed step by step firing is not provided.

The main object of the present invention is, therefore, to provide a pressure control system with timing elements to impose step-by-step operation of the fuel flow and damper mechanism for the purpose of effecting pressure stabilization in the boilers without imposing rapid variations in pressure on opposite sides of a desired constant pressure.

Other objects of the invention will become apparent as the detailed description thereof proceeds.

In the drawings:

Figure 3 is a central vertical section through a Bourdon pressure gauge modified for use in this invention;

Figure 4 is a vertical section taken on the line 4—4 of Figure 3;

Figure 5 is a fragmentary section taken on the line 5—5 of Figure 3;

Figure 6 is a fragmentary elevation of part of the dial of the said pressure gauge.

Figure 1:
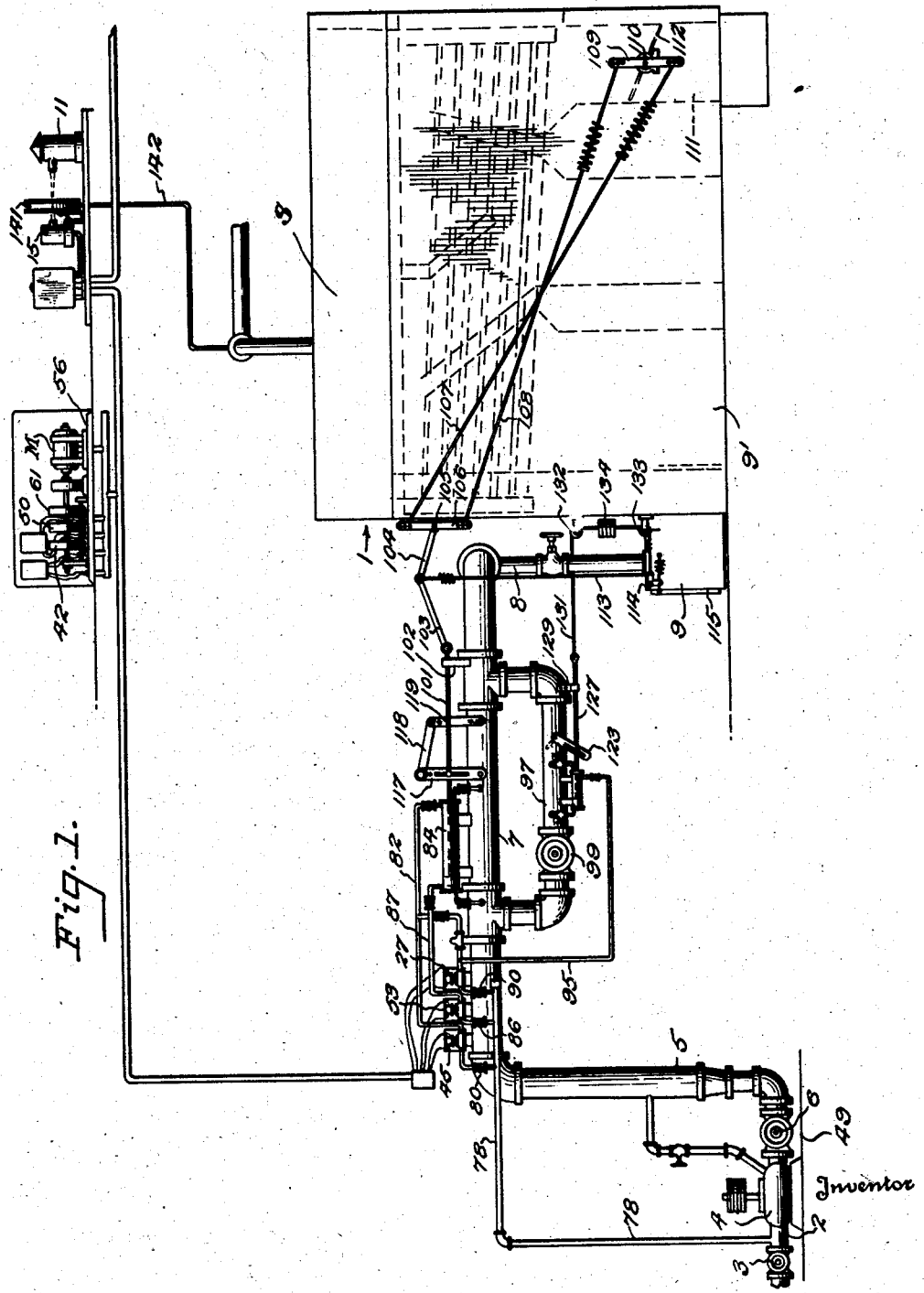
Figure 1 is an elevation of a constant pressure system embodying the present invention.

As shown in Figure 1 of the drawings, the invention is adapted to be applied to a steam generating system designated generally by the reference character 1. This system, for the purpose of illustration, is assumed to be operated by gas under pressure and supplied from a main 2 controlled by a valve 3. The main 2 is connected to one side of a safety valve 4, to the other side of which is connected a fuel feed pipe 5 in which a valve 6 is interposed. The feed pipe 5 is connected to a horizontal main 7 extending toward the generating system 1 and terminating in a valve controlled down pipe 8 leading to fuel burners (not shown) in a burner box 9 opening into the combustion chamber 9'.

The flow of gas through the pipe 5 and main 7 can be manually controlled by the various valves illustrated. It is preferable, however, to control this flow automatically by the apparatus illustrated generally in Figure 1 and in greater detail in Figure 2 of the drawings. The automatic control referred to comprises a pair of lamps 10 and 11, preferably unfrosted and operably connected to the mains 12 and 13. These lamps 10 and 11 are used to energize photoelectric cells 14 and 15, respectively; and a shutter 16, mounted for rotation between the lights and the cells, is operated in accordance with pressure variations in the steam chamber S of the system to control the transmission of light from one or the other of the two lamps 10 and 11 to the respective cells 14 and 15.

The photoelectric cells 14 and 15 include in their circuits the local batteries 17 and 18 which energize the electromagnets 19 and 20, respectively, when light from the lamps 10 and 11 is transmitted to the cells 14 and 15. The electromagnets 19 and 20 control the movements of switch rods 21 and 22, respectively. The switch rod 21 is normally held by means of a spring 23 against a stop member 24; and is adapted, when the electromagnet 19 is energized, to be drawn into contact with a contact terminal 25 on a wire 26. A solenoid 27 controls the operation of a valve in the high pressure part of the gas supply piping to be described hereinafter.

The circuit through the solenoid 27 and switch rod 22 is completed by a branch wire 28 from the main 12 to the pivoted end of the switch rod 22 and by wires 33 and 33' through solenoid 27 to the return main 13. The switch rod 22 is connected at its pivoted end to the wire 28 leading from the main 12, and is normally held in circuit breaking position by a spring 30 against the stop 31. When the magnet 20 is energized, it draws the switch rod 22 against the contact 32 at the end of a wire 33 leading to one terminal of an electromagnet 34, the other terminal of which is connected by a wire 35 to the return wire 13. The wire 26 is connected by a wire 36 to one terminal of an electromagnet 37, the other terminal of which is connected by a wire 38 to the return main 13. The wire 33 is tapped by a wire 39 to a brush 40 secured to a support of insulating material 41 fixed adjacent a commutator slip ring 42 in constant contact with the said brush. The wire 33 is also tapped by a wire 33' to one terminal of a solenoid 27, the other terminal of which is connected by a wire 29 to the return wire 13.

A wire 43 connects a second brush 44, mounted on the insulating brush support 41, to the solenoid 45, the circuit through which is completed by a wire 46 to the return main 13. A wire 47 is tapped from the wire 26 to a brush 48 mounted on an insulated support 49 fixed adjacent to a commutator slip ring 50 for the brush 48. A wire 51 connects a brush 52, also mounted on the support 49, to a solenoid 53, the circuit through which is completed by a wire 54 tapped to the wire 29 leading to the return main 13.

The rings 42 and 50 are mounted on a shaft 55 of a motor M supported by a plate 56. A timer switch 57 is also secured to the shaft 55 to be rotated in synchronism with the rings 42 and 50 and this switch and the rings are suitably insulated from each other and from the motor. The switch 57 comprises three conducting segments 58, 59, and 60, mounted on a conducting slip ring 61, and separated by gaps so as to break the circuit intermittently between two brushes 62 and 63 suitably mounted on an insulating support 64.

The brush 63 rides on the ring 65 while the brush 62 is supported so as to contact slidably with the outer periphery of the segments 58, 59, and 60. The brush 62 is connected by a wire 66 to the main 12, and brush 63 is connected by a wire 67 to a wire 68. The electromagnet 37 is normally energized and therefore normally holds a switch rod 69, against the tension of a spring 70, away from a contact terminal 71 at the end of the main 12. The switch rod 69 has its pivoted end connected to the wire 68 ending in a contact 72 arranged in the path of a switch rod 73 which is normally held by the electromagnet 34 out of contact with the contact 72 and against the tension of a spring 74.

The solenoids 45, 53 and 27, when energized, open valves 75, 76, and 77, respectively, controlling the flow of gas through the high gas pressure line 78. A pipe 79 controlled by the valve 80 connects the line 78 to one end of the casing 81 of the valve 75; and a pipe 82 controlled by a valve 83 connects the other end of the casing 81 to one end of a control cylinder 84. A pipe 85, controlled by a valve 86 is connected to one end of the casing 87 of valve 76; and a pipe 87 controlled by valve 88 is connected to the other end of cylinder 84. A pipe 89 controlled by a valve 90 is connected to one end of the casing 91 of the valve 77; and a pipe 92 controlled by a check valve 93 and a needle valve 94 is tapped into the pipe 82.

The pipe 92 is connected, between the valve casing 91 and check valve 93, by a pipe 95 to one end of a cylinder 96 controlling the flow of gas through a by-pass 97 connected on opposite sides of a butterfly valve 98 to the low pressure main 7. A manually operable valve 99 is arranged in the by-pass 97 in advance of the control cylinder 96. The needle valves 94 may be operated when desired to cut off communication between pipes 82 and 92.

A piston 100 reciprocates in the cylinder 84 and operates a piston rod 101 which slides through a bearing in a standard 102 suitably supported by the main 7. The outside end of the rod is pivoted to one end of a link 103 (see Figure 1) having its other end pivoted to one end of a second link 104 which has its other end fixed to a shaft 105. A lever 106 fixed to the end of the shaft 105 is connected by cables to the opposite ends of a similar lever 109 secured to the end of a shaft 110 extending into a flue 111 of the system and having a damper 112 suitably secured thereto. As shown in Figure 1, the levers 106 and 109 are provided with series of apertures for receiving the ends of cables 107 and 108 to vary adjustment of the damper 112 in accordance with rotation of lever 106. A cable 113 is connected at its upper end to the pivot connecting links 103 and 104 to each other, and has its lower end connected to a bell crank 114 for operating the draft louvres 115 (not shown in detail) controlling the admission of air to the combustion chamber 9'.

The rod 101 has a pin 115' projecting laterally therefrom, and slidable in a slot 116 formed in a link 117 having its lower end pivoted to the low pressure main 7. The upper end of link 117 is pivoted by a link 118 to the upper end of a link 119 having its lower end fixed to a shaft 120 extending across the main 7 and carrying the butterfly valve 98. It will be obvious from inspection of Figures 1 and 2 that reciprocation of piston 100 in cylinder 84 simultaneously operates the valve 98 and the damper 112.

The by-pass pipe 97 has a valve 121 mounted therein on a shaft 122 having one end projecting through the side of pipe 97. A lever 123 is adjustably connected at one end, by any suitable securing means such as a set screw 124, to the shaft 122, and is provided with a slot 125 in which is slidably mounted the pin 126 projecting laterally from the piston rod 127.

The rod 127 is connected at one end to a piston 128 reciprocable in the cylinder 96, and slides through a bearing 129 in a bracket 130 and has its free end connected to one end of a cable 131 extending around pulleys 132 and 133 fixed to a wall of the combustion chamber. The other end of the cable is fixed to the bell crank 114 controlling the burner louvres 115; and a weight 134 is fixed to the cable 131 between the pulleys 132 and 133.

The cylinder 84 has its opposite ends connected by relatively small valve controlled exhaust pipes 135 and 136 to the low pressure main 7; and the cylinder 96 is similarly connected by valve controlled pipes 137 and 138 to the by-pass pipe 97. By this means the gas under pressure in the cylinders exhausts into the low pressure main at such rate as to allow the pressure to build up as required, and also to allow the pressure gas to escape at both ends of the cylinders at a predetermined rate.

Figure 2:
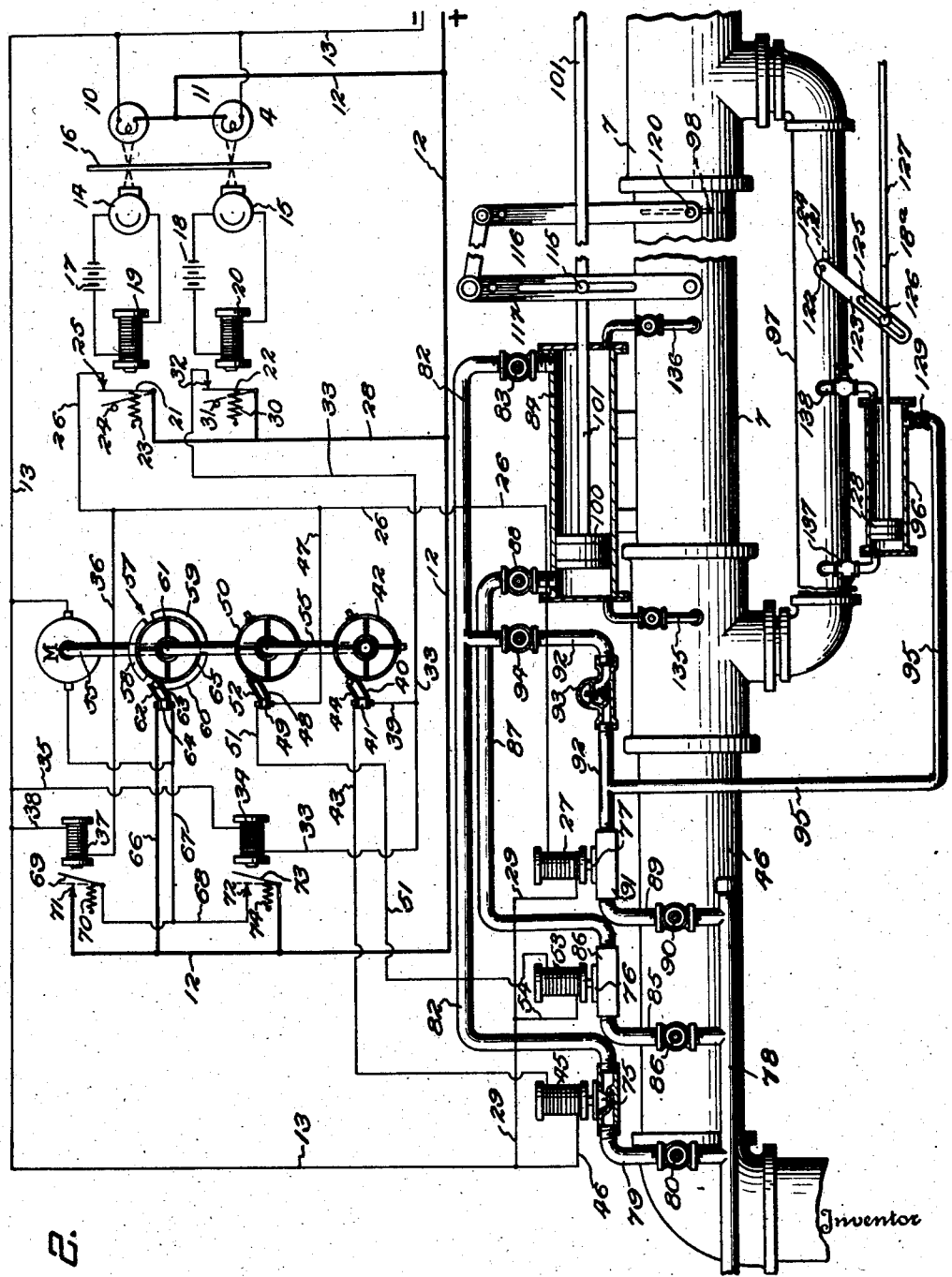
Figure 2 is a fragmentary side elevation of pressure control apparatus forming part of the present invention, the electrical elements thereof being shown in diagram.

The shutter 16 of Figure 2 is shown in Figure 5 as an arm 139 fixed at its center to the shaft 140 of a Bourdon pressure gauge 141 connected for operation to the steam chamber S by a pipe 142 (see Figure 1). The gauge has been modified to adapt it for control of the photo-electric cells by the lamps 10 and 11. The usual flexible pressure tube 143 is supported at one end on a hollow standard 144, and has its other end pivoted to the usual link and gear mechanism for rotating the shaft 140 in accordance with variations in pressure in the steam chamber S.

The fixed plate 144 takes the place of the usual pressure gauge dial, and is provided with two narrow slots 145 and 146 formed in alignment in a line below and parallel to the diameter of the plate. The back 147 of the gauge is provided with comparatively large holes 148 and 149 to permit light transmitted through the slots 145 and 146 to pass freely through the gauge, which, as shown in Figure 1, is interposed between the lights and photoelectric cells.

The arm 139 has its opposite ends provided with enlargements 150 and 151 adapted by rotation of shaft 140 to swing across the slots 145 and 146, respectively. The lower edge of the enlargement 150 is parallel to and slightly spaced from the upper edge of the slot 145 when the pressure in the steam chamber is at the selected and desired pressure. The enlargement 151 is provided with a slot 152, similar in contour and area to the slot 146. The part 152' is of such width, relative to the slot 146, that during the continued clockwise movement of the arm 139, the slot 152 will not register with the slot 146 until the piston 100 shall have reached its full travel to the left, and will have reduced fuel flow to the lowest set amount through the main 46.

The operative relation of the various elements of the system will become apparent by a description of the operation of the apparatus as a whole. Let it be assumed that the boiler plant is idle. Fires are first lit in the boiler in the usual manner by hand operation; and the valve 99 in the by-pass 97 is set to by-pass enough gas to take care of the average minimum of fuel required when the butterfly valve 121 is opened. This butterfly valve 121 is adjusted relative to its operating lever 123 so that when the piston 128 in the cylinder 96 moves said lever to its closing limit, the said butterfly valve is positioned to permit the flow of gas through the by-pass at the extreme minimum rate required by the plant. The piston 100 in the cylinder 84 of the main fuel line 7 is then caused to move to the full open position by operating the solenoid valve 76 by hand. Next, the draft conditions in the main stack damper are adjusted by hand and by manual adjustment of the valve 6 in the fuel line until the boiler is brought up to desired pressure at a desired rate of fuel feed.

The main switch (not shown) supplying current to the photo-electric control is then closed and the master damper of the system is opened, and the automatic photo-electric control assumes operation as an ordinary fireman. As the valve 6 has been opened to supply the maximum amount of fuel required at any time, the first change to take place obviously consists of a rise of pressure in the steam chamber in excess of the desired predetermined pressure. The arm 139 of the pressure gauge 141 will then rotate clockwise from the position shown in Figure 5, and as soon as it has moved about $\frac{1}{32}$" the light from the lamp will be occluded by the solid part of the arm and will thereby be prevented from operating the photo-electric tube 14. This occlusion of the light from the tube 14 deenergizes the electromagnet 19 and permits the spring 23 to draw the switch rod 21 away from the contact 25, thereby breaking the circuit through the electromagnet 37 and permitting the spring 70 to draw the switch rod 67 against the contact 71 and close the circuit through the brushes 62 and 63 on the motor control switch 57 to start the motor M in operation.

The motor M rotates the shaft 55 until one of the contact lugs on the commutator ring 42 contacts with the brush 44 to complete the circuit to the solenoid valve 75. The magnets 53 and 27 are therefore deenergized, valves 76 and 77 close, and valve 75 remains open and gas under pressure flows through the pipe 85 to the right hand end of the cylinder 84 and forces the piston 100 through a certain distance to the left in the said cylinder. This movement continues so long as the brush 44 engages one of the contact lugs on the commutator ring 42. As soon as the brush 44 separates from the contact lug immediately under it, the solenoid 45 of the valve 75 is deenergized and the valve closes and remains closed until the brush 44 makes contact with the next succeeding contact lug.

When the motor control ring 57 shall have moved until the brush 62 is over one of the gaps and magnets 34 and 37 again energized, the motor stops. It will be noted that the several contact lugs on the rings 50 and 42 are spaced on the respective rings so as to coincide in angular position on the shaft 55 with the positions of the notches on the motor control ring 57. The distance through which the piston 100 travels may be determined by adjustment of the various needle valves 83, 88, 94, etc. so as to govern the rate of flow of gas under pressure to the cylinder 84; and, also by the width of the wiping surface on the contact lugs on the commutator rings 50 and 42.

In an actual installation, it is found that the travel of piston 100 in its cylinder can be adjusted so that it will travel 1/7 of its stroke during the period of contact of the brushes with the lugs on either of the commutators 50 or 42. This stroke can be altered very readily in a few moments by changing the rate of flow of gas to the cylinder through adjustment of the needle valves provided. It has been found that the travel can be limited to 1/20 of the full stroke of the piston in the cylinder in the two and one-half seconds the lugs on the commutators are in contact with the brushes 44 and 52, without changing the lugs.

As soon as the lug on the ring 42 passes out of contact with the brush 44, the solenoid valve 75 closes and the piston comes to rest when the admitted gas under pressure escapes through the bleeder exhaust pipes 135 and 136 connecting the opposite ends of the cylinder 84 to the low pressure main 7. By this operation, the fuel supply to the furnace has been decreased and a period of rest follows during which the commutator ring 42 travels through a part of the revolution until another lug comes in contact with the brush 44. This period of rest gives the boiler time to respond to change of temperature in the furnace.

Let it be assumed that the pressure in the boiler is still too high when the brush contacts with one of the lugs on the commutator. The circuit will again be completed to the solenoid magnet 45 of the valve 75 and the piston 100 will be moved another step toward the left of the cylinder, thereby further reducing the flow of gas through the main 7 past the butterfly valve 98 and by the same amount as in the previous step; and another pause ensues for the same interval of time to give the boiler time to react to the changed condition of flow of gas. Let it be assumed that at this setting of the valve 98 sufficient gas will pass through the low pressure main 7 to maintain a constant pressure at the desired point in the boiler. Then, the solenoid 45 will be deenergized to close valve 75 and the pressure become balanced on both sides of the piston 100 in the cylinder 84, and the piston will remain in that position until the demand on the boiler changes.

In the meantime, the circuit will be closed through the solenoids 34 and 37 and the motor M will come to rest as soon as the control ring 57 arrives at such position that one of its gaps is located beneath the contact lug 62. This condition, of course, has been brought about by the change in fuel flow in the low pressure main 7 creating a change in pressure in the steam chamber so that the pressure gauge is operated to restore the arm 139 to its normal position in which both lamps transmit their light to both photo-electric tubes, and have therefore moved the switch rod 21 to close the circuit through the line 26.

Assume that the load on the boiler again decreases the pressure will have time to rise in the same manner described. The light will again be occluded from the photo-electric tube 14, gas will be further reduced, and the damper further closed as in the previously described case. Let it be assumed that the load goes down to such an extent that the valve 98 goes to its full closed position, as shown in Figure 2, and yet the pressure still slightly exceeds the desired point. The by-pass valve 121 will then be opened during the time the solid part of the arm 139 is over the slit 146 on the dial of the pressure gauge. It will then be apparent that if the amount of gas being by-passed in the valve 121 in open position is excessive, as soon as the arm 139 moves further in a clockwise direction until the slit 152 registers with the slit 146 in the pressure gauge dial, both photo-electric tubes will again be energized and the circuit will become completed to the auxiliary solenoid valve 77. The opening of valve 77 causes fuel to flow from the manifold 78 through pipe 95 to the right hand side of piston 128 in cylinder 96, thereby moving piston 128 and valve 121 against the pull of weight 134 to decrease still further the flow of fuel from the main 7 through the by-pass 97 to the burners.

The condition of pressure on both sides of the piston 100 will be balanced and the piston will remain at the extreme left end of its travel. Just enough gas is allowed to flow through the check valve 93 to assure that the piston will remain in that position; but gas will be admitted to the right hand end of the cylinder 96 which operates the by-pass valve 121, and as soon as this pressure builds up the piston will move to the left raising the counterweight 134 (see Figure 1) and closing the louvres in front of the burner chamber 9'. This will reduce the gas flowing in the by-pass to a point not in excess of the minimum requirement of the plant at any time.

Therefore, it will be seen that the next change in boiler load will cause the pressure to drop and it will be apparent that the first thing to happen will be that the by-pass valve 121 will open; and as soon as the steam demand rises to justify it, the piston 100 in the cylinder 84 will start operating in step by step movements to adjust the fuel flow and damper regulations to meet the new requirements. It will be evident that at this point, the mechanism will cause the louvre in front of the burners to open whenever the valve 98 in the main gas line is in any position but the closed one.

The operation of the valve 76 is controlled by the photoelectric tube 15 and is substantially the same as the operation of the valve 75. However, the valve 76 is used to increase the flow of fuel through the main 7 by moving the piston 100 toward the right of its position as shown in Figure 2. The opening and closing of the valve 76 is effected by the commutator ring 50 in precisely the same manner as the opening and closing of the valve 75 is effected by the commutator ring 42.

When the arm 139 of the pressure gauge rotates counter-clockwise in accordance with pressure conditions in the steam chamber, it covers the slot 145 and deenergizes the photoelectric tube 15, thereby deenergizing the magnet 20. The switch arm 22 is then pulled by the spring 30 into open circuit position against the stop 31. This circuit break deenergizes the magnet 34 and permits the spring 74 to draw the switch arm 73 into conducting contact with the contact point 72. The motor M will then be energized through the main 12, wire 73', the switch arm 73, contact point 72, wires 67 and 67' to the motor M, and through the motor M to the return line 13.

The rotation of the motor, of course, rotates the commutator ring 50; and when the ring 50 reaches such position as to close the circuit across the brushes 48 and 52, the circuit is closed through the solenoid 53 of the valve 76 to effect the opening of said valve with the consequent admission of fuel to the left hand side of the piston 100 as shown in Figure 2. The circuit through this valve 76 is effected through the main 12, wire 28, conducting switch arm 21, contact 25, wire 26, wire 47, brush 48, commutator ring 50, brush 52, wire 51, solenoid 53, wire 54, and wire 29 to the return line 13.

The left hand step by step operation of the piston 100 under the control of the valve 76 is effected in precisely the same manner as a similar operation of the piston 100 by the valve 75 in the opposite direction.

It is to be noted that the solenoid 27 is connected in the circuit of the solenoid 53, except that it is connected before the timing unit and will remain energized so long as light is admitted through the slot 146. Whenever the solenoid 27 becomes deenergized by occlusion of light through the slot 146, the counterweight 134 causes a maximum predetermined flow of fuel in the by-pass pipe 97 by pulling the piston 128 to the right hand end of the cylinder 96.

With continued rise in pressure, the arm 139 continues to move in clockwise direction, indicating that a further reduction of fuel to the furnace is required. As previously stated, the solid portion 152' of the arm 139 below the slot 152, is sufficiently wide to ensure that by the time the slot 152 admits light to the slot 146, to reenergize the solenoids 53 and 27, the piston 100 will have reached its extreme travel to the left, and will have reduced fuel flow to the lowest set amount through the main 46. When the slot 152 registers with the slot 146, all three solenoid valves become energized and the pressure becomes balanced on each side of the piston 100; but, pressure is then admitted to the right hand end of the piston 128 to cause the piston to move to the left in the cylinder 96 and thereby reduce the flow of fuel in the by-pass line 97.

Under the conditions just described, fuel will be admitted to the furnace at the lowest rate of flow possible; and, as this rate of flow has been predetermined to be slightly less than that required to maintain proper boiler pressure, the only thing possible thereafter will be a slow falling off of pressure in the steam drum 1. When this decrease of pressure occurs, the arm 139 rotates counterclockwise until light is again occluded from the slot 146 and the counterweight 134 again opens the valve in the by-pass line 97 to increase the flow of fuel in this line; while the piston 100 remains stationary, unless a greater demand is made for steam from the drum 1.

So long as steam demand is at its lowest point, the auxiliary cylinder 96 will take care of the fuel flow. It will be apparent, however, that sooner or later the demand for steam on the drum 1 will again reach the point where the shutter 139 returns to its initial position as shown in Figure 5 of the drawings, which is the normal desired position, in which operation of the auxiliary by-pass is no longer required. If the demand continues to increase above the amount of fuel supplied when the shutter returns to normal position, then the arm 139 moves further counterclockwise to occlude light from the slot 145 by the portion 150 of arm 139. Solenoid valves 53 and 27 will then be energized, causing the piston 100 to start moving in steps to the right in order to increase flow in the main 46, just the same as when the flow was reduced. Of course, the piston 128 in the by-pass line closes again; but, when fuel is admitted to the main line in steps by the action of the piston 100, there is no further use for the by-pass flow, and the piston 100 automatically compensates for reduction of flow in the by-pass 97.

Of course, it must be understood that each application of the invention will require adjustment to suit the installation but the master control and timing devices can be standardized for all pressure installation. It will also be apparent that if firing to constant temperature instead of to constant pressure is desired, that the pressure gauge can be replaced by a thermometer or pyrometer constructed similarly to the pressure gauge disclosed herein to bring about this required condition. It is, therefore, to be understood that even though the device be described as adapted for pressure control, it is intended to be applied also to temperature control, or both pressure and temperature control, when the claims refer to pressure it must be understood that this is for convenience only, and that the invention is to be considered broad enough to include temperature as well as pressure control.

It is, of course, to be understood that the fluid pressure for actuating the piston or equivalent motor need not be derived from a fluid concerned with the generation of the pressure to be controlled as is the case in the present embodiment, but that it may for instance be derived from a foreign source, such as a water main.

The invention is not to be considered as limited to the use of photoelectric relays or to any particular type of pressure gauge. In one form of the invention, shown in Figure 7, the photoelectric relays have been eliminated, and the pressure gauge has been modified so that the controlling electromagnets 19 and 20 of the system are operated by a wiping contact of the gauge indicator over a series of conducting terminals connected to the relays 19 and 20 to effect the same result as that disclosed in connection with the system illustrated fully in Figure 2.

In the modified form of the invention, the switch rods 21 and 22 are held by the springs 23 and 30 against the contact terminals 25 and 32, respectively; and are adapted to be withdrawn from these contacts by energization of the electro-magnets 19 and 20. This is merely the reverse of the operation inherent in the system indicated in Figure 2. The wiring connecting the switch rods 21 and 22 and contacts 25 and 32 to the mains 2 and to the various control solenoids, is identical with that shown in Figure 2 of the drawings.

Figure 7:
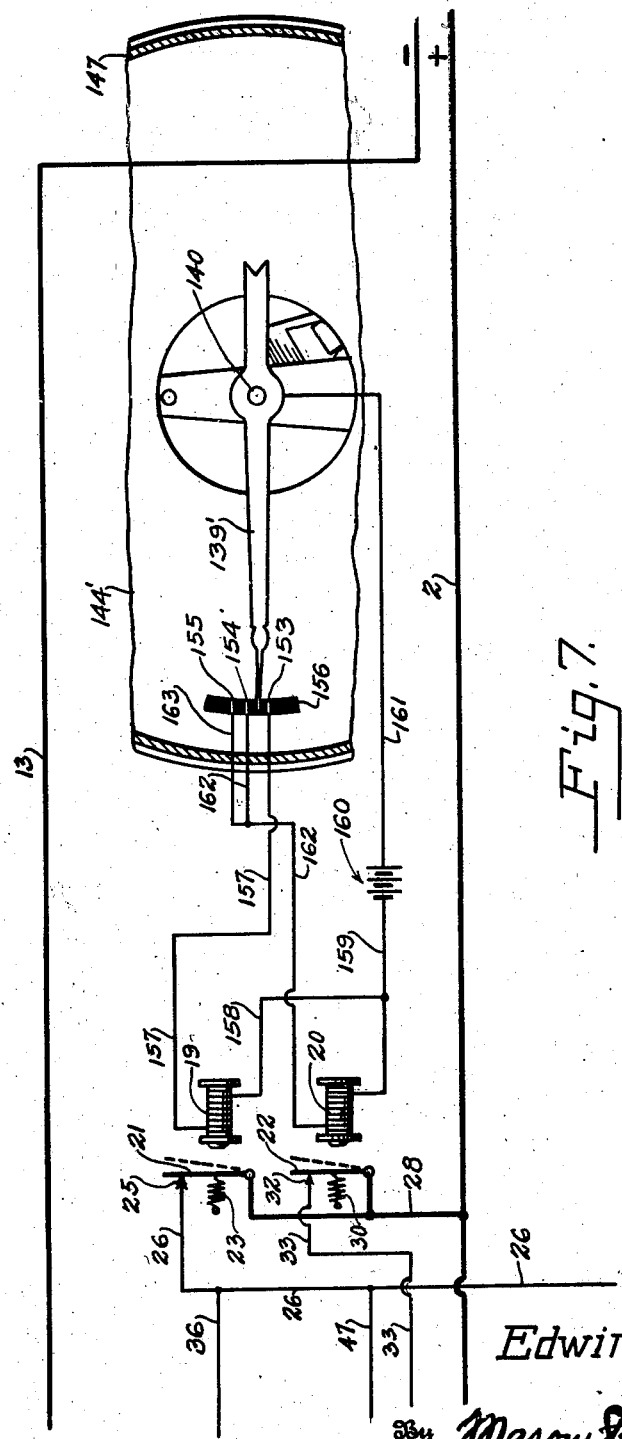
Figure 7 is a fragmentary diagram illustrating a modification in the pressure gauge of this system, with a corresponding modification in the control relays.

The pressure gauge indicated roughly in Figure 7 is operated by the mechanism shown in Figure 4 of the drawings. In this case, however, the dial 144' is not slotted as in the form shown in Figures 5 and 6. An indicator 139' is secured to the shaft 140 and the point of this indicator sweeps over the conducting terminals 153, 154 and 155, suitably insulated from each other and mounted on the plate 144' by means of the strip of insulating material 156. The terminal 153 is connected by wire 157 to one terminal of the electromagnet 19; and a wire 158 connects the other terminal of magnet 19 through a wire 159 to the battery 160, the other side of which is connected by a wire 161 to the indicator 139'. The conducting terminal 154 is connected by a wire 162 to one terminal of the electromagnet 20, the other terminal of which is connected by the wire 159 to the battery 160. The conducting terminal 155 is connected by wire 163 to the wire 162 which as previously described is connected to one terminal of the magnet 20.

It will be apparent from inspection of Figure 7 that when the indicator 139' lies between the terminals 153 and 154, both of the electromagnets 19 and 20 are de-energized and the switch rods 21 and 22 remain in contact with the contact terminals 25 and 32. As the indicator 139' moves clockwise across the insulating strip 156, it makes contact successively with the terminals 154 and 155; and in each case energizes the electromagnet 20 to pull the switch rod 22 away from contact 32 and thereby break the circuit through the wire 33. Movement of the indicator in the opposite direction over the insulating strip 156 and into contact with the terminal 153 will, of course, energize the electromagnet 19 to pull the switch rod 21 away from contact 25 and break the circuit through the wire 26.

The operation so far as controlling the timing mechanism and solenoid valves illustrated in Figure 2 is concerned are identical with the operation of the same mechanism by the photo-electric relay system shown in Figure 2. It is immaterial just what precise pressure operated structures may be used to control the operation of the magnets 19 and 20. It will be obvious that the wiping engagement of the indicator 139' with the strip 156 and the conducting terminals embedded therein should be constructed so as to present as little friction as possible to the movement of the indicator over the strip and to eliminate arcing as much as possible. The battery 160 should be of very low voltage to reduce arcing and a trolley wheel may be mounted on the end of the indicator 139' to reduce friction between that indicator and the conducting strip. The photo-electrically controlled system is preferred, since it eliminates objectionable friction and arcing inherent in the positive wiping contact control system.

While I have in the above description disclosed a practical application of the invention, it is obvious that the particular system as shown and described, or the details of construction of the several instrumentalities therein combined, may be varied or modified according to the necessities of use without departing from the spirit and scope of the invention as claimed.

What I claim is:

1. In automatic control of fluid pressure, pressure regulating means, photo-electric actuated means responsive to one or another of selectively controlled light beams for moving said pressure regulating means in a plus or minus direction with respect to the value of the pressure to be regulated responsive to one or another of selectively controlled light beams, means movable in response to variations in the pressure to be regulated for actuating said photo-electric operated means by the selective occlusion of said light beams, and timing mechanism connected to the first named means to effect the movements of the pressure regulating means intermittently in timed steps.

2. In automatic control of fluid pressure, pressure regulating means, means responsive to one or another of selectively controlled light beams for moving said pressure regulating means in a plus or minus direction with respect to the value of the pressure to be regulated and including a fluid pressure actuated element, means for supplying fluid pressure to said element, means movable in response to variations in the pressure to be regulated for differentially varying the operation of the second named means by the selective occlusion of said light beams, and timing mechanism connected to the first named means to effect the movements of the pressure regulating means intermittently in timed steps.

3. In automatic control of fluid pressure, pressure regulating means, means for moving said pressure regulating means in a plus or minus direction with respect to the value of the pressure to be regulated, including a fluid pressure actuated element, individual means for supplying fluid pressure selectively with plus or minus effect to said fluid pressure actuated element, photo-electric circuits for each fluid pressure supplying means, each including a light sensitive current varying element, means for projecting a light beam toward each element, means movable in response to variations in the pressure to be regulated for selectively occluding one or the other of said light beams, and timing mechanism connected to the first named means to effect the movements of the pressure regulating means intermittently in timed steps.

4. In automatic control of fluid pressure as claimed in claim 3, the beam occluding means comprising a screen having slots therethrough, and a rotatable shutter responsive to the fluid pressure to be regulated having its ends normally adjacent to and clear of said slots, said shutter alternately occluding one or the other of said slots when rotated from its normal position.

5. In automatic control of fluid pressure as claimed in claim 3, the light beam occluding means including a screen having slots therethrough, a rotatable shutter having its ends normally adjacent to and clear of said slots but to alternately occlude one or the other of said slots in other positions of said shutter, and a vessel in communication with the pressure to be regulated and deformable under variations of said pressure and operatively connected to said shutter.

6. In automatic control of fluid pressure, pressure regulating means, means for moving said pressure regulating means in a plus or minus direction with respect to the value of the pressure to be regulated, including a fluid pressure actuated element, individual electrically operated means for supplying fluid pressure selectively with plus or minus effect to said fluid pressure actuated element, said means being in circuit with an adequate power source, and including relays, photo-electric circuits for said relays each including a light sensitive current varying element, means for projecting a light beam toward each element, means movable in response to variations in the pressure to be regulated for selectively occluding one or the other of said light beams, and timing mechanism connected to the first named means to effect the movements of the pressure regulating means intermittently in timed steps.

7. In automatic control of fluid pressure, pressure regulating means, means for moving said pressure regulating means in a plus or minus direction with respect to the value of the pressure to be regulated, including a fluid pressure actuated element, electrically operated valves communicating with a source of fluid under pressure and with said pressure actuated element for selectively supplying fluid pressure thereto with plus or minus effect, electric operating means for said valves in circuit with an adequate power source and including relays, photo-electric circuits for said relays each including a light sensitive circuit varying element, means for projecting a light beam toward each element, means movable in response to variations in the pressure to be regulated for selectively occluding one or the other of said light beams, and timing mechanism connected to the first named means to effect the movements of the pressure regulating means intermittently in timed steps.

8. In automatic control of fluid pressure, pressure regulating means, and means for moving the same in a plus or minus direction with respect to the value of the pressure to be regulated, including a cylinder and piston, the latter having a normal intermediate position in said cylinder, valves communicating with a source of fluid pressure and with said cylinder on opposite sides of said piston, electrical means for operating said valves in circuit with an adequate power source and with relays, photo-electric circuits for said relays, each including a light sensitive current varying element, means for projecting a light beam toward each element, means movable in response to variations in the pressure to be regulated, for selectively occluding one or the other or neither of said light beams, and timing mechanism connected to the first named means to effect the movements of the pressure regualting means intermittently in timed steps.

9. In automatic control of fluid pressure, pressure regulating means, means for moving said pressure regulating means in a plus or minus direction with respect to the value of the pressure to be regulated including a fluid pressure actuated element, individual means for supplying fluid pressure selectively with plus or minus effect to said fluid pressure actuated element, photo-electric circuits for each fluid pressure supplying means, each including a light sensitive current varying element, means for projecting a light beam toward each element, means movable responsive to variations in the pressure to be regulated for selectively occluding one or the other or neither of said light beams, means intercalated in series in said photo-electric circuits providing intermittently closed gaps for imposing a step by step retardation on the control of said current varying elements, and timing mechanism connected to the first named means to effect the movements of the pressure regulating means intermittently in timed steps.

10. Automatic fluid pressure control system including a steam boiler and a conduit for feeding fuel under pressure to the furnace of said boiler, said conduit including a reducing valve, means for regulating the flow of fuel to said boiler for controlling combustion conditions in the furnace of said boiler, a fluid pressure motor for actuating said regulating means, valves communicating with said fuel feed conduit on the high pressure side of said reducing valve for supplying fluid under pressure selectively and intermittently with plus or minus effect to said fluid pressure motor, said motor having bleed passages exhausting into said conduit on the low pressure side of said reducing valve, electrically actuated means for operating said valves, said means being in circuits which include an adequate power source, and relays, photo-electric circuits for said relays, each including a light sensitive current varying element, means for projecting a light beam toward each element, and light beam occluding means including fixed screen having apertures registering with the axes of said light beams, a rotatable shutter having slots adapted simultaneously to register with said slots in one position of said shutter but to alternately occlude one or the other of said slots in other positions of said shutter, and a vessel in communication with the steam boiler, and deformable under variations of boiler pressure, operatively connected to said shutter.

EDWIN L. DENNIS.